United States Patent
Huber et al.

(10) Patent No.: US 10,938,284 B2
(45) Date of Patent: Mar. 2, 2021

(54) METHOD AND APPARATUS FOR PRODUCING AN INSULATION ELEMENT

(71) Applicants: ROBERT BOSCH GmbH, Stuttgart (DE); Aumann Espelkamp GmbH, Espelkamp (DE)

(72) Inventors: Michael Huber, Bühl (DE); Christopher Ludwigs, Karlsruhe (DE); Juergen Hagedorn, Lübbecke (DE)

(73) Assignees: Robert Bosch GmbH, Stuttgart (DE); Aumann Espelkamp GmbH, Espelkamp (DE)

( * ) Notice: Subject to any disclaimer, the term of this patent is extended or adjusted under 35 U.S.C. 154(b) by 280 days.

(21) Appl. No.: 16/097,937

(22) PCT Filed: Apr. 18, 2017

(86) PCT No.: PCT/EP2017/059144
§ 371 (c)(1),
(2) Date: Oct. 31, 2018

(87) PCT Pub. No.: WO2017/190943
PCT Pub. Date: Nov. 9, 2017

(65) Prior Publication Data
US 2019/0149024 A1      May 16, 2019

(30) Foreign Application Priority Data
May 2, 2016   (DE) .......................... 102016207532.2

(51) Int. Cl.
*H02K 15/02* (2006.01)
*B23P 19/00* (2006.01)
(Continued)

(52) U.S. Cl.
CPC ............. *H02K 15/10* (2013.01); *H02K 3/345* (2013.01); *H02K 15/12* (2013.01)

(58) Field of Classification Search
CPC ........ H02K 15/10; H02K 15/12; H02K 3/345; H01C 17/242; Y10T 29/49012; Y10T 29/49227; Y10T 29/53152
(Continued)

(56) References Cited

U.S. PATENT DOCUMENTS 3,702,498 A  *  11/1972  Mason ................... H02K 15/10
                                                    29/596
6,065,204 A  *   5/2000  DeHart .................. H02K 15/10
                                                    29/596
(Continued)

FOREIGN PATENT DOCUMENTS

DE      102004030716       1/2006
WO       2015019685        2/2015

OTHER PUBLICATIONS

International Search Report and Written Opinion of the Intl. Searching Authority dated May 2, 2016 for PCT/EP2017/059144.

*Primary Examiner* — Donghai D Nguyen
(74) *Attorney, Agent, or Firm* — Tucker Ellis LLP (57) ABSTRACT

The present invention relates to a method for producing an insulating element for a stator base body or a rotor base body or a single tooth base body, comprising the steps of: providing an insulating material, receiving or generating or retrieving processing data based on which the insulating material has to be processed in order to manufacture the insulating element, and processing the insulating material by means of a laser device according to the processing data for producing the insulating element from the insulating material, wherein the processing data define at least one interface for cutting the insulating material and/or at least one weakening site for weakening the insulating material, and wherein the processing comprises cutting the insulating
(Continued)

material along the interface and/or weakening the insulating material along the weakening site.

15 Claims, 3 Drawing Sheets

(51) Int. Cl.
*H02K 15/10* (2006.01)
*H02K 3/34* (2006.01)
*H02K 15/12* (2006.01)

(58) Field of Classification Search
USPC .......................................... 29/598, 887, 734
See application file for complete search history.

(56) References Cited

U.S. PATENT DOCUMENTS

| | | | |
|---|---|---|---|
| 6,875,950 B2* | 4/2005 | Naumov | H01C 17/242 219/121.68 |
| 2013/0300248 A1 | 11/2013 | Takeshi | |

* cited by examiner

METHOD AND APPARATUS FOR PRODUCING AN INSULATION ELEMENT

RELATED APPLICATION DATA

This application is a national phase application of International Application No. PCT/EP2017/059144 filed Apr. 18, 2017 and published in the German language.

STATE OF THE ART

The present invention relates to a method for manufacturing an insulating element for a stator base body. Further, the invention relates to a device for manufacturing an insulating element for a stator base body or a rotor base body or a single tooth base body. Advantageously, the method according to the invention can be performed with the device according to the invention.

From the state of the art, it is known to manufacture stators as packets of individual metal sheets. In this manner, a stator base body or a rotor base body or a single tooth base body is created. Alternatively, the stator base body or rotor base body or single tooth base body can be manufactured from a solid material in a machined and/or [formed] manner. The stator base body or rotor base body or single tooth base body is provided with a wire coil, wherein electric fields can be generated by means of the wire coil. These electric fields serve for driving a rotor, with the stator being electrically commutated.

In order to avoid a short circuit between the stator base body or the rotor base body or the single tooth base body and the coil in a safe and reliable manner, an insulating paper is usually used, which is inserted between the stator base body or the rotor base body or the single tooth base body and the coil. Such an insulating paper is cut out from a paper web by means of a cutting blade or punch elements, wherein prior to that fold edges are imparted by means of embossing rolls. Then, the element that is cut out from the paper web can be folded at the fold edges so that the insulating paper thus created can be brought to abut the stator base body or rotor base body or single tooth base body, in particular inside grooves of the stator base body or rotor base body or single tooth base body.

What is disadvantageous in the state of the art is that a separate tool has to be made for each different shape and dimension of the stator base body or rotor base body or single tooth base body in order to correctly place the cutting edges and the fold edges. In addition, the design freedom of the paper is restricted by the embossing rolls and the cutting blades or punch elements.

DISCLOSURE OF THE INVENTION

The method according to the invention makes it possible to manufacture insulating elements, which are in particular insulating papers, for a stator base body in a simple and cost-effective manner, wherein the insulating elements can be adjusted to different shapes and dimensions of a stator base body or a rotor base body or a single tooth base body, wherein a rotor base body or a stator base body can be assembled from individual tooth base bodies without a new tool being necessary for this purpose. In particular, each insulating element can be manufactured in an exact manner, whereby a high-quality insulation can be provided between the stack of sheets of the stator base body or the rotor base body or the single tooth base body and the coil of the stator base body or the rotor base body or the single tooth base body.

The method according to the invention for manufacturing an insulating element for a stator base body or a rotor base body or a single tooth base body comprises the following steps: At first, an insulating material is provided. It is in particular realized in the form of a material web. The material web comprises the insulating material which advantageously consist of a plastic material. In addition, the plastic material can be coated. Further, receiving or generating or retrieving of processing data is carried out. What is to be understood here by retrieving is that already existing processing data are used. The processing data comprise data based on which the insulating material is to be processed in order to obtain the insulating element therefrom. The processing data can be stored beforehand, and can be loaded from a storage or alternatively can be newly received. Preferably, the insulating element is inserted into a groove of the stator base body or the rotor base body or the single tooth base body, so that the processing data comprise at least one interface for cutting the insulating material and/or at least one weakening site for weakening the insulating material. In this way, different sizes of the insulating element can be realized by means of different arrangement of the interfaces. In particular, the weakening sites facilitate a simple and precise folding of the insulating material, so that different shapes of the insulating element can be obtained by means of different arrangements of the weakening sites. Thus, it can be achieved that a plurality of different insulating elements can be made from one insulating material, wherein the insulating element can be adjusted to different shapes of a stator base body, in particular of a groove of the stator base body, based on the arrangement and dimensioning of the weakening sites and/or the interfaces.

Further, a step of processing the insulating material is carried out based on the processing data. The processing is carried out by means of a laser device, in particular by means of a CO2 laser. Thus, the insulating element can be manufactured by processing the insulating material. Preferably, the entire processing of the insulating material that is necessary for producing the insulating element is carried out exclusively by the laser device. The processing by means of the laser device comprises cutting the insulating material along the interface as well as weakening the insulating material along the weakening site. In particular, multiple interfaces and/or multiple weakening sites along which the insulating material is cut and/or weakened can be present.

By means of the laser device, different shapes of the insulating element can be made from the insulating material in a simple and cost-effective manner. Thus, the use of different tools can be foregone. Rather, the method according to the invention makes it possible to use a single tool, namely the laser device, to manufacture a plurality of different insulating elements from the insulating material.

The subclaims show preferable further developments of the invention.

Preferably, the step of weakening the insulating material comprises inserting an indentation into the insulating material. The indentation in particular extends in parallel to the weakening site. Alternatively or additionally, the step of weakening comprises perforating the insulating material. What is to be understood by perforating is a repeated section-by-section cutting through the insulating material along the weakening site, so that cut areas and non-processed and thus non-cut areas alternate regularly along the weakening site. As compared to inserting the indentation, perforating has the advantage that an output power of the laser device does not need to be changed. In this way, the perforating can be performed with the same output power as the cutting. For inserting the indentation, it is provided that an output power of the laser device is reduced as compared to cutting, so that only a part of the thickness of the insulating material is removed. In particular, the indentation is made in such a manner that three quarters, advantageously half, particularly preferably one quarter, of the thickness of the insulating material is removed. Thus, it can be achieved that the insulating material can be folded at the weakening site in a simple and reliable manner in order to fold the insulating material.

Particularly advantageously, inserting the indentation and/or the perforating is performed along an arc-shaped weakening site. Particularly advantageously, inserting the indentation and/or the perforating is performed along an S-shaped weakening site. This facilitates subsequent folding of the insulating material. Thanks to the laser device, the arc-shaped and/or S-shaped weakening site can be manufactured in a simple and cost-effective manner.

Preferably, measuring of the stator base body or the rotor base body or the single tooth base body is carried out before the processing data are received. Measuring can preferably be carried out individually for every single stator base body or rotor base body or single tooth base body for which at least one insulating element is to be manufactured. It is particularly preferred if a stator base body or a rotor base body or a single tooth base body is measured once to subsequently make all insulating elements for the stator base body or the rotor base body or the single tooth base body. Alternatively, it is preferably advantageous if a stator base body or a rotor base body or a single tooth base body is measured multiple times to obtain the exact measurements for manufacturing the individual insulating elements for the stator base body or rotor base body or single tooth base body. Preferably, it is additionally provided that the processing data are generated from measurements of the stator base body or the rotor base body or the single tooth base body. Thus, the manufactured insulating element is exactly adjusted to the stator base body or rotor base body or single tooth base body, whereby a safe and reliable insulation is facilitated. At the same time, manufacturing is rendered easier due to the use of the laser device.

A length of the insulating element, which is defined by a distance between two opposing interfaces, is preferably determined based on a measured thickness of the stator base body or rotor base body or single tooth base body. Here, an offset is added to the measured thickness. The offset is preferably maximally five millimeters, in particular maximally three millimeters, advantageously maximally one millimeter, particularly preferably maximally half a millimeter. Through the offset, it is ensured that a safe and reliable insulation is provided. In particular, an insulation mask or another type of insulation can be applied to the face surfaces of the stator pack, so that the insulating element abuts at the insulation mask through the offset. In this manner, a safe and reliable insulation is present, wherein preferably likewise any provided air and leakage paths, in particular according to EN 60664-1, are observed.

In particular, a plurality of insulating elements is manufactured for the stator base body or rotor base body or single tooth base body. Here, each insulating element can respectively be inserted into a groove of the stator base body or rotor base body or single tooth base body. In order to manufacture the individual insulating elements, preferably one single measuring of the stator base body is performed, so that the processing data are identical for all insulating elements. In particular, a thickness of the stator base body or rotor base body or single tooth base body is determined only once and is used for manufacturing all insulating elements for this stator base body or rotor base body or single tooth base body. In this way, the effort for performing measurements is minimized. Processing data are preferably newly determined by measuring the stator base body or rotor base body or single tooth base body for each new stator base body or rotor base body or single tooth base body for which insulating elements are to be manufactured.

Alternatively, it is provided that the processing data are adjusted individually for every single insulating element. Here, it is in particular provided that measuring of each individual groove of the stator base body or of the rotor base body or of the single tooth base body is carried out, so that processing data can be generated for each individual insulating element that is provided for the corresponding groove. Alternatively, the individual processing data are previously stored and thus can be retrieved or loaded. By providing individually adjusted processing data, a high flexibility can be obtained when it comes to manufacturing the insulating elements.

The processing data preferably comprise a pattern that is to be applied to the insulating material and/or an inscription that is to be applied to the insulating material. The pattern and/or the inscription in particular facilitates trackability and/or assignability of the insulating elements to individual grooves of the stator base body or rotor base body or single tooth base body. The step of processing preferably comprises applying the pattern and/or the inscription to the insulating material. Thus, a labelling of the insulating element can be produced in a simple and cost-effective manner, since no additional tool is needed.

Preferably, a time period for processing the insulating material based on the processing data is maximally one second. It is particularly preferred if the time period is maximally half a second. In this manner, the insulating element can be manufactured quickly, with exact manufacturing at the same time being ensured through the laser device.

The invention further relates to a manufacturing device for producing an insulating element for a stator base body or a rotor base body or a single tooth base body. The manufacturing device comprises a material supply, a laser device and a control unit. The material supply serves for supplying an insulating material. The laser device is configured for processing the insulating material, wherein the control unit is configured for controlling the laser device. The controlling of the laser device by the control unit is in particular performed based on the processing data. Thus, the control unit is additionally embodied for receiving and/or generating processing data. Through the processing of the insulating material by the laser device, the insulating element can be manufactured from the insulating material. Here, manufacturing is in particular performed within a short period of time, preferably within one second, particularly preferably within half a second. The processing of the insulating material comprises the processes of cutting and weakening. What is to be understood here by weakening is that only a portion of the insulating material is removed. This can preferably be realized by perforating and/or inserting an indentation. By means of the process of cutting, the insulating elements is defined in its dimensions. By means of the process of weakening, the kinks at which the insulating material can be folded to manufacture the insulating element can be inserted into the insulating material. The laser device preferably comprises a CO2 laser. This can in particular be set with respect to an output power and/or a moving speed so as to optionally cut through the insulating material completely or only to weaken it. Thus, the manufacturing device according to the invention facilitates quick and exact manufacturing of a plurality of different insulating elements. In particular, any switching of tools, as it is necessary in the state of the art, is avoided in the manufacturing device according to the invention.

The manufacturing device preferably has a measuring device for measuring the stator base body or rotor base body or single tooth base body. In particular, the measuring device is configured for measuring a thickness of the stator base body or the rotor base body or the single tooth base body. Alternatively or additionally, the measuring device is embodied for measuring at least one dimension of at least one groove of the stator base body or the rotor base body or the single tooth base body. Thus, the target dimensions that the finished insulating elements are supposed to have can be determined by means of the measuring device. This makes it possible to manufacture a plurality of different insulating elements, wherein each insulating element is adjusted to the stator base body or the rotor base body or the single tooth base body to be insulated and/or the groove of the stator base body or of the rotor base body or of the single tooth base body to be insulated. In this manner, it is further preferably prevented that a tool for manufacturing the insulating elements from the insulating material has to be switched. Rather, different shapes of the insulating element can be achieved with this laser device alone. For this purpose, the measuring device is configured for sending the measuring results of the measuring process to the control unit and/or for sending processing data generated based on the measuring process to the control unit. In that case, the control unit can control the laser device according to the processing data in order to produce the insulating element. Thus, the manufacturing device can be flexibly adjusted, and facilitates a quick manufacture of insulating elements that are adjusted to the stator base body or rotor base body or single tooth base body that is to be insulated.

SHORT DESCRIPTION OF THE DRAWING(S)

In the following, exemplary embodiments of the invention are described in detail by referring to the accompanying drawing. In the drawing.

EMBODIMENT(S) OF THE INVENTION

Figure 1:
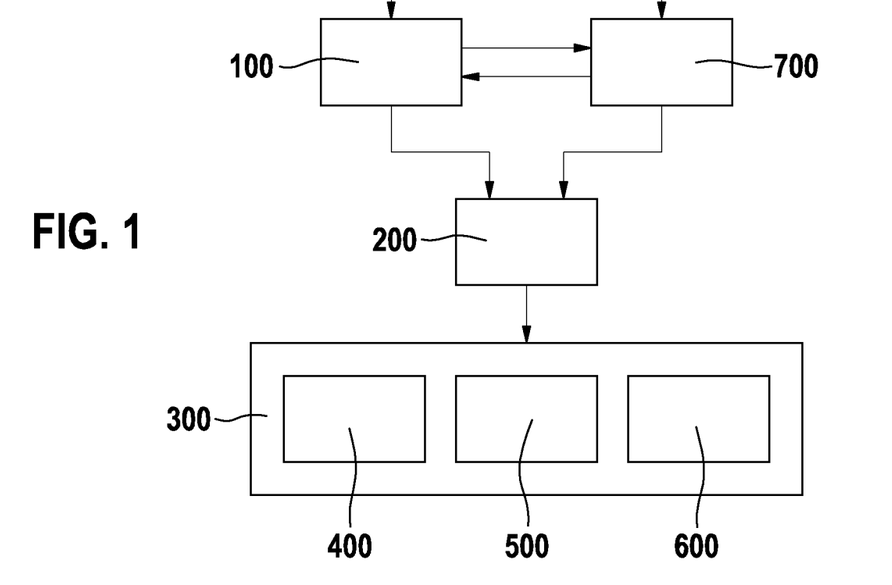
FIG. 1 shows a schematic rendering of a flow of a method according to an exemplary embodiment of the invention

FIG. 1 schematically shows a flow of a method according to an exemplary embodiment of the invention. The method serves for manufacturing an insulating element 2, which is in particular shown in FIG. 5. With the insulating element 2, a stator base body 3 (cf. also FIG. 5) can be insulated. In the shown exemplary embodiment, the insulating element 2 serves for insulating a groove 8 of the stator base body 3. The exemplary embodiment is limited to a stator base body 3, wherein alternatively it is also possible to use rotor base bodies or single tooth bodies from which a stator base body or a rotor base body can be assembled.

Figure 5:
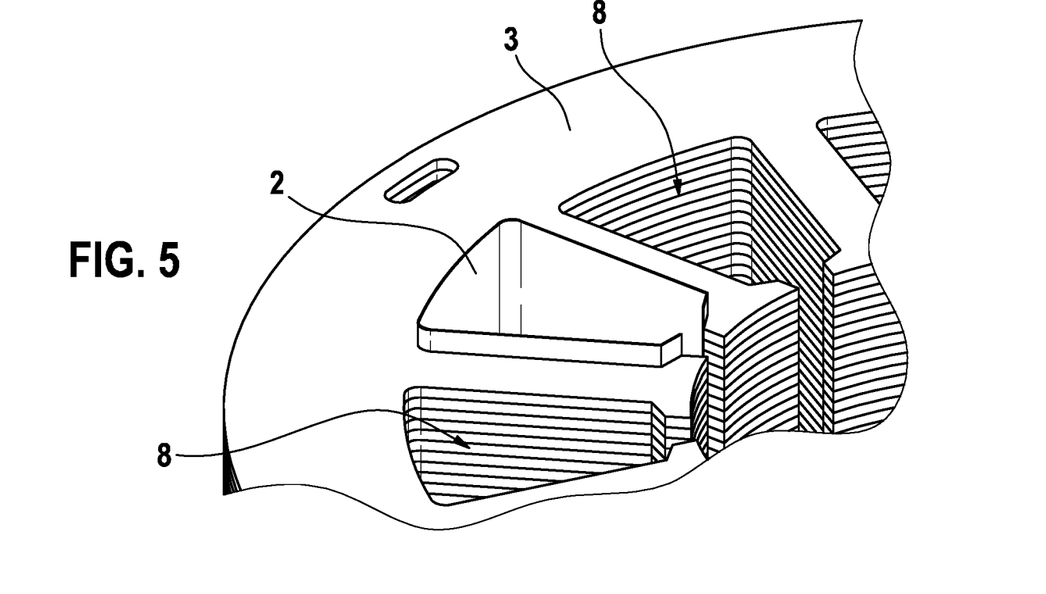
FIG. 5 shows a schematic rendering of a stator base body with an inserted insulating element that has been manufactured by means of the method according to the exemplary embodiment of the invention.

In most cases, stator base bodies 3 comprise a plurality of individual metal sheets, so that the stator base body 3 comprises a stack of sheets. The stator base body is provided with a coil by winding at least one electrical conductor around the stack of sheets, so that a current flow through the electrical conductor results in an electrical field that can turn a rotor that is arranged relative to the stator base body 3. Thus, the stator base body 3, together with the coil of the electrical conductor, represents a stator of an electric motor.

To avoid that a short circuit occurs between the stator base body 3 and the electrical conductor, an insulation has to be inserted. For this purpose, by means of the method according to the exemplary embodiment, the insulating element 2 can be manufactured which can be inserted into respectively one groove 8 of the stator base body 3 and thus protects the electrical conductor from any direct contact with the stator base body 3. Preferably, an insulation mask or another type of insulation is applied to the face surfaces of the stator base body 3, so that the stack of sheets of the stator base body 3 is completely insulated from the electrical conductor.

The method comprises a step of providing 100 an insulating material 4. The insulating material 4 is the base material from which the insulating element 2 is to be made. In particular, the insulating material 4 is a strand-shaped or web-like base material from which the insulating element 2 can be cut out. The insulating material 4 can be a coated or a non-coated plastic material.

Further, the method comprises a step of measuring 700 the stator base body 3. Based on the measuring 700, the framework conditions for manufacturing the insulating element 2 can be determined. Thus, each insulating element 2 that is to be inserted into a groove 8 of the stator base body 3 has to have exactly the dimensions of the groove 8. Further, in order to achieve a safe and reliable insulation, the insulating element 2 has to project beyond the ends of the stator base body 3. In this manner, preferably at least one thickness of the stator base body 3 is determined in the course of the measuring 700. Advantageously, the dimensions of the groove 8 of the stator base body 3 are additionally determined. Based on these data, processing data can be generated. The processing data comprise processing steps as to how the insulating material 4 is to be processed in order to manufacture the insulating element 2 therefrom.

The processing data preferably comprise the processes of cutting 400 and weakening 500. For this purpose, cutting sites 5 as well as weakening sites 6 at which the processes of cutting 400 and weakening 500 are to be performed are defined.

Subsequently, the receiving 200 of the processing data occurs. In particular, a processing unit receives the processing data from a measuring unit. This makes it possible to manufacture the insulating element 2 from the provided insulating material 4.

The step of measuring 700 is advantageously performed optionally. Starting at the step of providing 100, the method can progress directly to that of receiving 200. Alternatively, the measuring 700 can be carried out after, before or during that of providing 100. In the case that measuring 700 is not carried out, the same processing data are received during reception 700 that have been generated in the course of a previously performed measuring 700. Alternatively, pre-defined standard processing data are received.

A subsequent step of processing 300 the insulating material 4 serves for manufacturing this insulating element 2. For this purpose, the insulating material 4 is processed according to the processing data by means of a laser device. The processing 300 preferably comprises cutting 400 along the interface 5 and weakening 500 along the weakening site 6.

Figure 2:
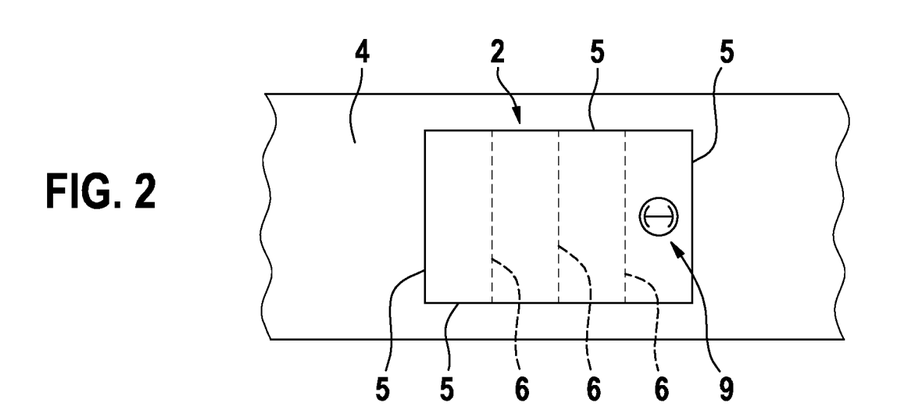
FIG. 2 shows a schematic rendering of an insulating element that is manufactured from an insulating material by means of the method according to the exemplary embodiment of the invention.

The processing 300 is illustrated in FIG. 2. Here, it is shown how an insulating element 2 can be manufactured by processing the insulating material 4 based on the processing data. For this purpose, the insulating material 4 is completely cut through at the interfaces 5 by the laser device. Before that process, a weakening 500 of the insulating material 4 is advantageously performed at each weakening site 5. Thus, the insulating material 4 can be easily folded at the weakening sites 5. Thus, the insulating element 2 can be manufactured in a simple and cost-effective as well as quick manner. By using the laser device for processing 300, different shapes of the insulating element 2 can be easily manufactured, with no switching of tools being necessary.

Figure 3:
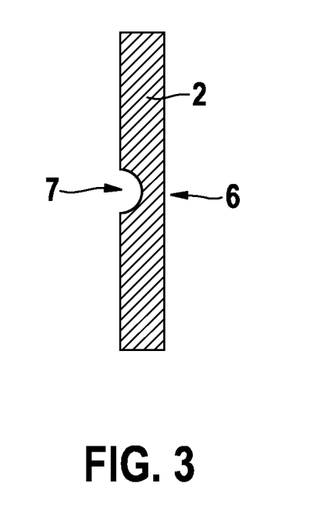
FIG. 3 shows a schematic rendering of a first alternative of a weakening site of the insulating element that has been manufactured by means of the method according to the exemplary embodiment of the invention.
Figure 4:
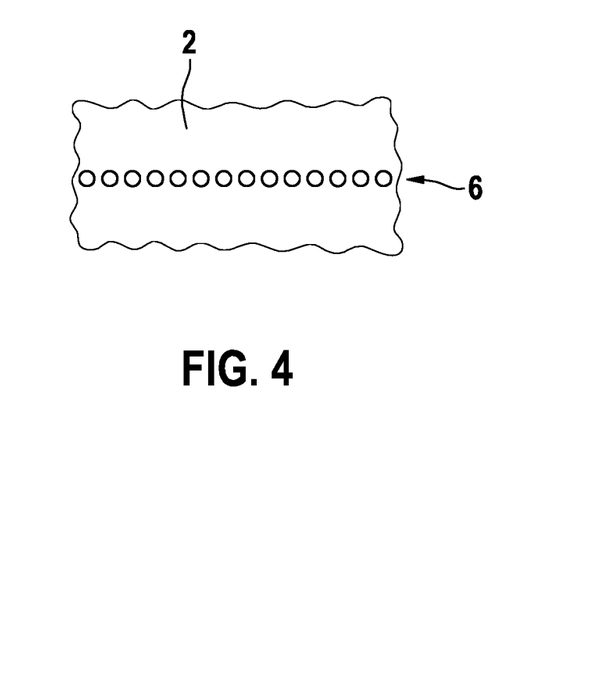
FIG. 4 shows a schematic rendering of a second alternative of a weakening site of the insulating element that has been manufactured by means of the method according to the exemplary embodiment of the invention.

Different possibilities of weakening 500 are shown in FIG. 3 and FIG. 4. FIG. 3 shows a first alternative in which the insulating material 4 is partially removed at the weakening site 6. In particular three quarters, preferably half, particularly preferably one quarter, of the thickness of the insulating material 4 is removed. This can advantageously be achieved by an output power of the laser device being reduced as compared to the step of cutting 400, so that the remaining output power is no longer sufficient for completely cutting through the insulating material 4.

FIG. 4 shows a second alternative in which a perforation is carried out along the weakening site 6. The weakening site 6 is formed by repeatedly cutting through the insulating material 4 section by section. The second alternative has the advantage that the output power of the laser device can remain constant and does not have to be reduced for forming the weakening sites 6. Thus, controlling of the laser device is simplified.

The first alternative as well as the second alternative facilitate an arc-shaped design of the weakening site. In particular, an S-shaped weakening site 6 can be manufactured. This facilitates a simple folding of the insulating material.

Preferably, the step of processing 300 can additionally comprise an application 600 of a pattern 9 and/or an inscription. Through the laser device, the pattern 9 and/or the inscription can be applied to the insulating material 4 in a simple and precise manner. Thus, it is preferably possible to apply indications as to at which position and/or at which stator base body 3 the manufactured insulating element 2 is to be positioned.

FIG. 5 schematically shows a stator base body 3, wherein an insulating element 2 is inserted into one of the grooves 8 of the stator base body 3. As can further be seen, the insulating element 2 projects beyond the edges of the stator base body 3 since a length of the insulating element 2 is greater than a thickness of the stator base body 3. This is preferably achieved due to an offset that has been determined during the step of measuring 700 being added to the thickness of the stator base body 3. The result is regarded as the length of the insulating element 2 to be manufactured, which is in particular represented by a distance of two opposing interfaces 5 (cf. FIG. 2). An insulation effect is ensured by the projection of the insulating element 2 beyond the stator base body 3. The face surfaces of the stator base body 3 are advantageously provided with an insulation mask, so that no contact whatsoever can occur between a coil and the stator base body 3 also at these positions, and preferably likewise provided air and leakage paths, in particular according to EN 60664-1, are observed.

As can be seen in FIG. 5, a stator base body 3 comprises a plurality of grooves 8. According to the method according to the preferable exemplary embodiment of the invention, an insulating element 2 can be manufactured for each of these grooves 8. Here, the step of measuring 700 preferably is to be performed only once in order to determine a thickness of the stator base body 3. Subsequently, the method is repeatedly performed until all insulating elements 2 for the stator base body 3 are manufactured, wherein the step of measuring 700 is omitted. Only when insulating elements 2 for a new stator base body 3 are to be produced is the step of measuring 700 again performed once to determine a thickness of the new stator base body 3. Alternatively, measuring 700 of each of the individual grooves 8 of the stator base body 3 is performed, so that each manufactured insulating element 2 is exactly matched to one groove 8 of a stator base body 3.

Manufacturing the insulating element 2 from the insulating material 4 requires a time period of maximally one second, preferably of maximally half a second. This can in particular be achieved through the speed of the laser device. Here, in addition to its speed, the method according to the exemplary embodiment has a high degree of flexibility, since different shapes of the insulating element 2 can be easily manufactured.

The step of folding which is necessary for manufacturing the insulating element 2 corresponds to the state of the art and thus is not described in detail. The same applies to inserting the insulating element 2 into a groove 8 of the stator base body 3.

Figure 6:
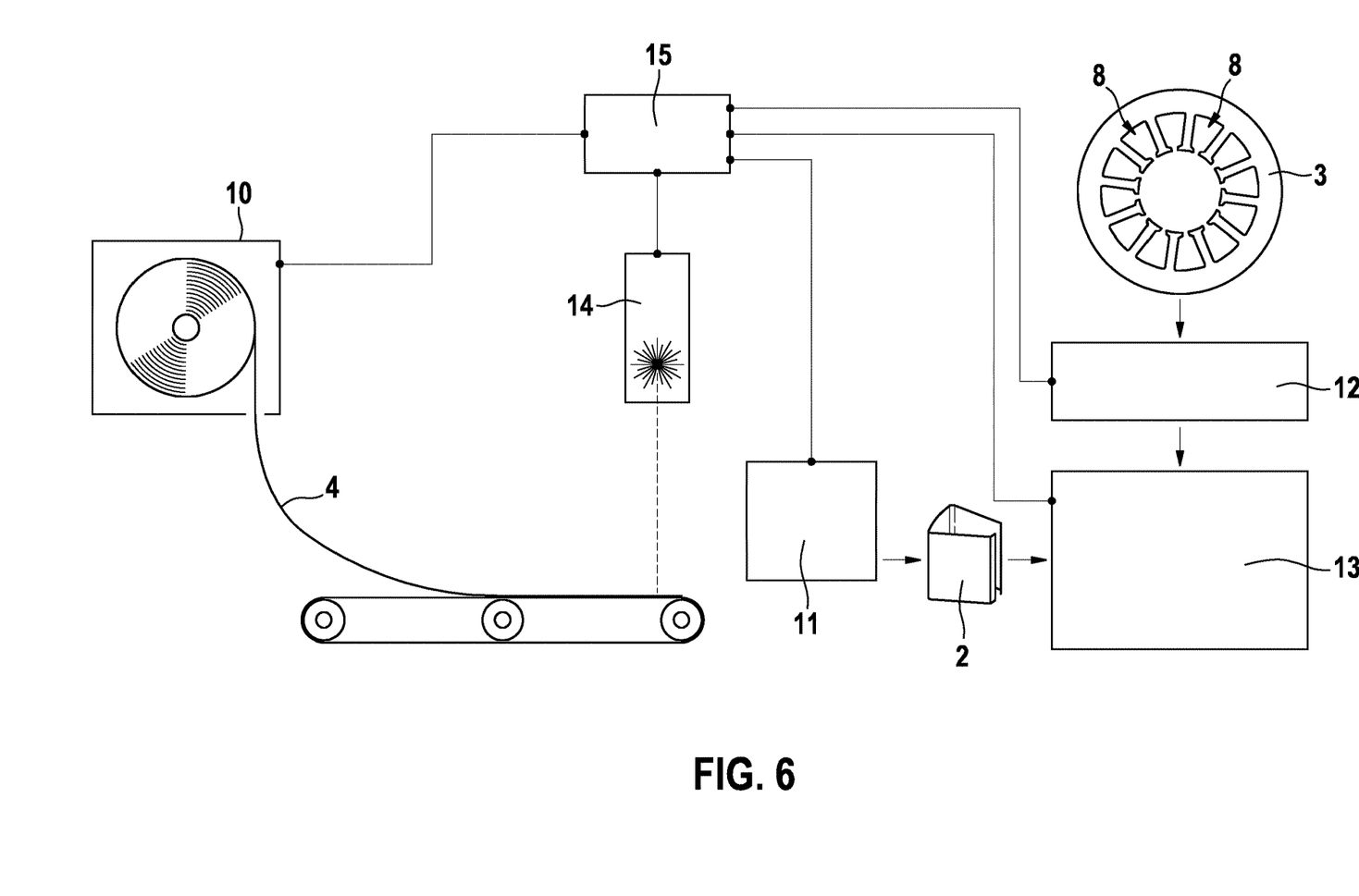
FIG. 6 shows a schematic rendering of a manufacturing device according to an exemplary embodiment of the invention.

FIG. 6 shows a manufacturing device 1 according to an exemplary embodiment of the invention. By means of the manufacturing device 1, insulating elements 2 can be made from an insulating material 4. The manufacture of the insulating element 2 is carried out in particular according to the previously described method.

The manufacturing device 1 comprises a material supply 10, a laser device 14, a measuring device 12, a folding device 11, an insert device 13 and a control device 15. Here, the material supply 10 in particular serves for performing the step of providing 100 the insulating material 4. The measuring device 12 in particular serves for performing the step of measuring 700. The laser device 14 and in particular also the folding device 11 preferably serve for performing the step of processing 300. By means of the insert device 13, the manufactured insulating element 2 can be inserted into the stator base body 3.

For signal transmission, the control device 15 is connected to the material supply 10, the laser device 14, the measuring device 12, the folding device 11 and the insert device 13. The control device 15 in particular serves for receiving processing data that have been generated by the measuring device 12 based on the measurements 700 of the stator base body 3. Alternatively or additionally, the control device 15 is configured for generating processing data, in particular in the case that no measuring 700 has been performed by the measuring device 12.

The laser device 14 preferably comprises a CO2 laser. The CO2 laser can be manufactured in a simple and cost-effective manner and allows for safe and reliable processing 300, in particular cutting 400 and weakening 500, of the insulating material 4.

After the insulating material 4 has been processed by the laser device 14, with the laser device 14 being controlled for the purpose of processing 300 by the control device 15 corresponding to the processing data, the insulating material 4 is folded by the folding device 11. Subsequently, the finished insulating element 2 is transferred to the insert device 13, in which the insulating element 2 is inserted into a groove 8 of the stator base body 3.

The manufacturing device 1 facilitates fast and exact manufacturing of insulating elements 2, wherein different shapes of the insulating elements 2 can be realized in simple manner and with little effort. In this way, different shapes can be realized in a simple manner by a corresponding control of the laser device 14. In this manner, it is in particular possible to avoid any switching of tools.

The invention claimed is:

1. A method for producing an insulating element for a stator base body or a rotor base body or a single tooth base body, comprising the steps of:
   providing an insulating material,
   receiving or generating or retrieving processing data based on which the insulating material has to be processed in order to manufacture the insulating element, and
   processing the insulating material by means of a laser device according to the processing data for producing the insulating element from the insulating material,
   wherein the processing data define at least one interface for cutting the insulating material and/or at least one weakening site for weakening the insulating material, and
   wherein the processing comprises cutting of the insulating material along the interface and/or weakening of the insulating material along the weakening site.

2. The method according to claim 1, characterized in that the weakening of the insulating material comprises inserting an indentation into the insulating material and/or a perforating of the insulating material.

3. The method according to claim 2, characterized in that inserting of the indentation and/or perforating is performed along an arc-shaped weakening site.

4. The method according to claim 3, characterized in that inserting of the indentation and/or perforating is performed along an S-shaped weakening site.

5. The method according to claim 1, characterized in that, prior to receiving the processing data, measuring of the stator base body or the rotor base body or the single tooth base body is carried out, wherein the processing data are generated from the measuring of the stator base body or the rotor base body or the single tooth base body.

6. The method according to claim 5, characterized in that a plurality of insulating elements is manufactured for the stator base body or the rotor base body or the single tooth base body, which can respectively be inserted into a groove of the stator base body or the rotor base body or the single tooth base body, wherein the processing data are identical for all insulating elements.

7. The method according to claim 5, characterized in that a plurality of insulating elements is manufactured for the stator base body or the rotor base body or the single tooth base body, which can respectively be inserted into a groove of the stator base body or the rotor base body or the single tooth base body, wherein the processing data are individually adjusted for every single insulating element.

8. The method according to claim 1, characterized in that a length of the insulating element, which is defined by a distance between two opposing interfaces, is determined based on a measured thickness of the stator base body or the rotor base body or the single tooth base body, wherein an offset is added to the measured thickness.

9. The method according to claim 1, characterized in that the processing data comprise a pattern to be applied to the insulating material and/or an inscription to be applied to the insulating material, wherein the processing comprises applying the pattern and/or of the inscription to the insulating material.

10. The method according to claim 1, characterized in that a time period for processing the insulating material based on the processing data is maximally one second.

11. A manufacturing device for producing an insulating element for a stator base body or a rotor base body or a single tooth base body, wherein the manufacturing device is configured to perform the method of claim 1, the manufacturing device comprising:
   a material supply for supplying the insulating material,
   the laser device for processing the insulating material, and
   a control unit for receiving and/or generating and/or retrieving the processing data and for controlling the laser device based on the processing data, wherein the insulating element can be manufactured from the insulating material by means of processing the insulating material.

12. The manufacturing device according to claim 11, characterized by having a measuring device for measuring the stator base body or the rotor base body or the single tooth base body, in particular for measuring a thickness of the stator base body or the rotor base body or the single tooth base body and/or a dimension of at least one groove of the stator base body or of the rotor base body or of the single tooth base body, wherein the measuring device is formed for sending the measuring results and/or the processing data generated based on the measurement to the control unit.

13. The method according to claim 1, characterized in that a time period for processing the insulating material based on the processing data is maximally half a second.

14. A manufacturing device for producing an insulating element for a stator base body or a rotor base body or a single tooth base body, comprising:
   a material supply for supplying an insulating material,
   a laser device for processing the insulating material,
   a control unit for receiving and/or generating and/or retrieving processing data and for controlling the laser device based on the processing data, and
   a measuring device for measuring the stator base body or the rotor base body or the single tooth base body, in particular for measuring a thickness of the stator base body or the rotor base body or the single tooth base body and/or a dimension of at least one groove of the stator base body or of the rotor base body or of the single tooth base body, wherein the measuring device is formed for sending the measuring results and/or the processing data generated based on the measurement to the control unit, wherein the insulating element can be manufactured from the insulating material by means of processing the insulating material, and wherein processing the insulating material comprises the processes of cutting and/or of weakening of the insulating material.

15. A manufacturing device configured to produce an insulating element for a stator base body or a rotor base body or a single tooth base body, wherein the manufacturing device comprises:

a material supply for supplying an insulating material, a laser device configured to process the insulating material, and a control unit configured to receive and/or generate and/or retrieve processing data that defines at least one interface for cutting the insulating material and/or at least one weakening site for weakening the insulating material, the control unit is further configured to control the laser device based on the processing data, to process the insulating material according to the processing data for producing the insulating element from the insulating material by cutting the insulating material along the interface and/or weakening the insulating material along the weakening site.

* * * * *